May 30, 1967 C. H. MUELLER ET AL 3,322,234
LUBRICATING APPARATUS
Filed Jan. 15, 1965 2 Sheets-Sheet 1
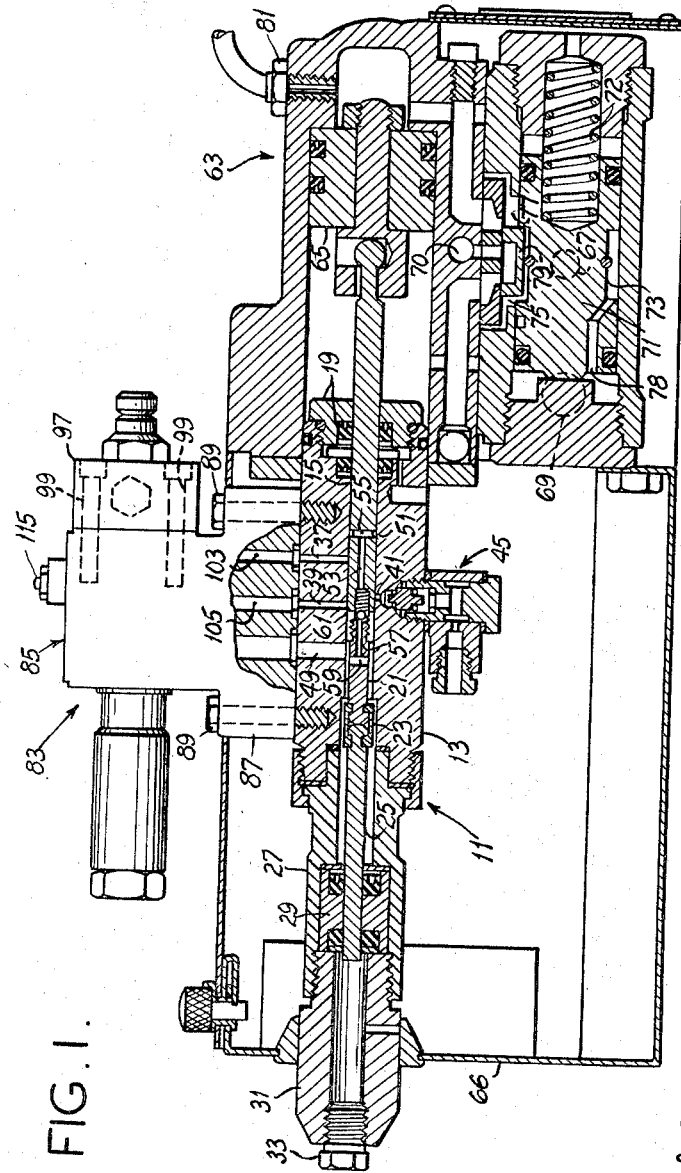
Carl H. Mueller,
Lutwin C. Rotter,
Jerome B. Wegmann,
George Weitzel,
Inventors.
Koenig, Senniger, Powers and Leavitt,
Attorneys.

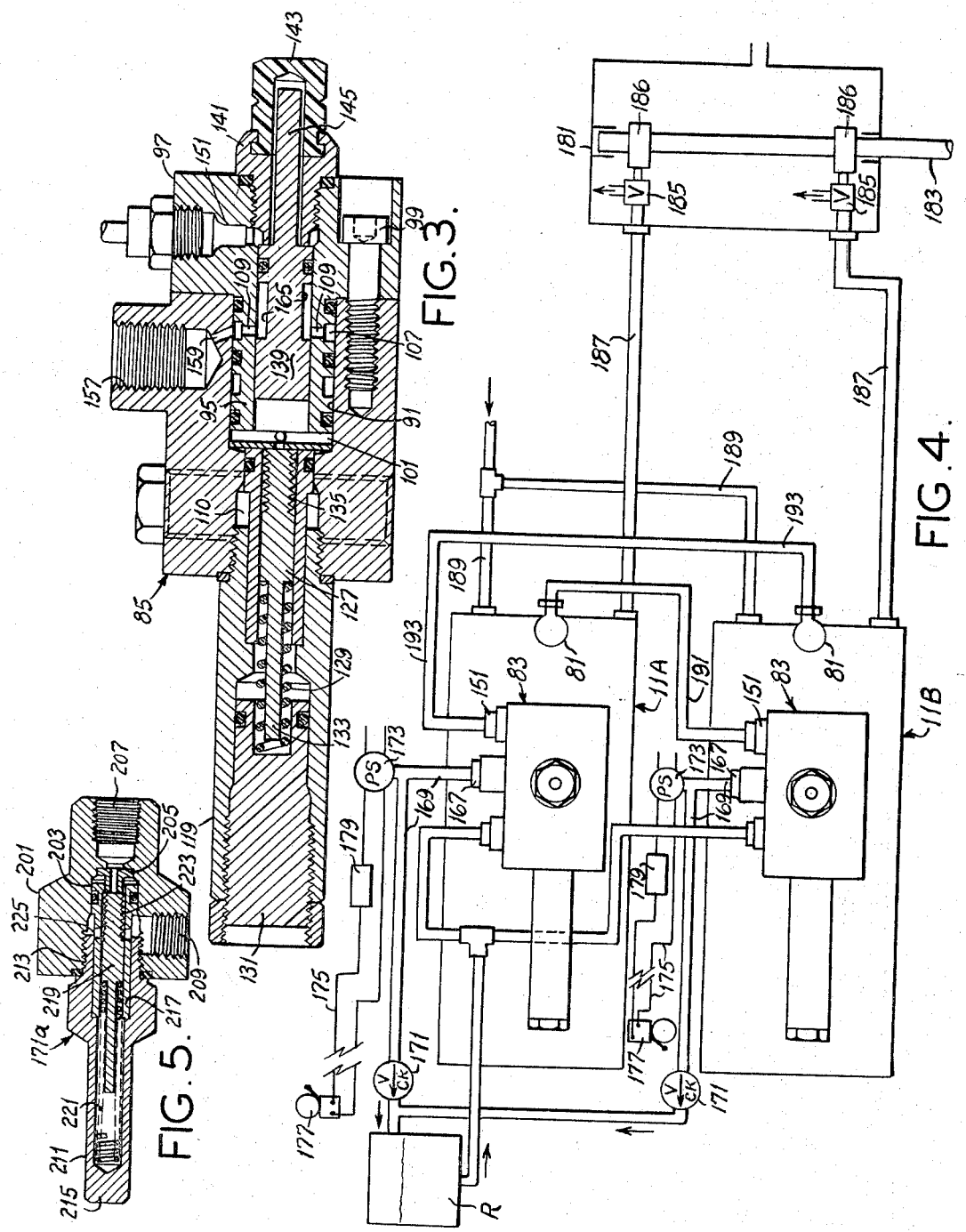

United States Patent Office 3,322,234
Patented May 30, 1967

3,322,234
LUBRICATING APPARATUS
Carl H. Mueller, Pasadena Hills, Lutwin C. Rotter, Ladue, Jerome B. Wegmann, Florissant, and George Weitzel, Bridgeton, Mo., assignors to McNeil Corporation, Akron, Ohio, a corporation of Ohio
Filed Jan. 15, 1965, Ser. No. 425,707
26 Claims. (Cl. 184—6)

This invention relates to a device for detecting failure of operation of a pump, and more particularly to a so-called failure indicator for detecting failure of operation of an intermittently-acting lubricant pump or injector of a type which meters out small quantities of lubricant on each cycle of operation.

The failure indicator of this invention is particularly adapted for use in conjunction with a lubricant injector of the type shown in the coassigned U.S. Patent 2,694,977 of Lutwin C. Rotter, issued Nov. 23, 1954, though not limited to such use. The injector shown in said patent essentially comprises a cylinder having a lubricant inlet and a series of outlet ports spaced at intervals along its length, and a plunger working in the cylinder adapted on a pressure stroke to force small metered volumes of lubricant out through each outlet port in the series in succession. An important use of such injectors is for lubrication of costly machinery in remote unattended locations, such as large engines and pumps in remotely located unattended gas and oil pumping stations. Any prolonged undetected failure of operation of an injector properly to deliver lubricant to the points of lubrication of such an engine or pump serviced thereby may result in serious damage to the engine or pump. Such failure may be due to malfunctioning of the injector itself, or extraneous causes. Accordingly, among the several objects of this invention may be noted the provision of a failure indicator for use in conjunction with an injector such as described, or any other type of pump which intermittently delivers a small quantity or quantities of lubricant or other fluid on each cycle (as distinguished from providing a continuous flow of fluid), adapted reliably to detect and signal failure of the injector or pump properly to deliver lubricant or other fluid; the provision of a failure indicator such as described adapted to interpose a time delay in signalling a failure of delivery to avoid signalling a temporary failure of delivery of lubricant or other fluid; the provision of a failure indicator such as described adapted to accommodate relatively wide variation in the temperature and hence the viscosity of lubricant, noting that lubrication systems such as used in remotely located pumping stations may be subject to wide variation in ambient temperature; the provision of such an indicator which is relatively economical to manufacture; and the provision of a valve construction especially suitable for use in conjunction with the failure indicator. Other objects and features will be in part apparent and in part pointed out hereinafter.

The invention accordingly comprises the constructions hereinafter described, the scope of the invention being indicated in the following claims.

FIG. 1 is a view partially in elevation and partially in section showing a lubricant injector of the type shown in U.S. Patent 2,694,977 equipped with a failure indicator of this invention;

FIG. 2 is a vertical section of the failure indicator per se, on a larger scale than FIG. 1;

FIG. 3 is a horizontal section taken on line 3—3 of FIG. 2;

FIG. 4 is a diagrammatic view showing an air supply system for two associated failure indicators of this invention, also showing certain lubricant lines and electric circuitry; and FIG. 5 is a longitudinal section of a special check valve such as may be used in the FIG. 4 lubricant lines.

Corresponding reference characters indicate corresponding parts throughout the several views of the drawings.

Referring to the drawings, FIG. 1 illustrates a lubricant pump or injector 11 of the type disclosed in the above-noted Rotter U.S. Patent 2,694,977. This generally comprises a main cylinder 13 having a central bore within which closely fits a plunger 15. At the right-hand end of the cylinder 13, as viewed in the drawings, the plunger 15 enters the central bore through a seal 19. The left-hand end of the plunger 15 is coupled, through a valve fitting 21 and a collar 23, to a plunger extension 25 which is smaller in diameter than plunger 15. Plunger extension 25 passes through an extension 27 of cylinder 13 and leaves the cylinder through a seal 29. The variably projecting end of the plunger extension 25 is protected by a hollow cap member 31 which is closed at its outer end by a plug 33.

The external surface of the cylinder 13 is preferably polygonal, e.g., hexagonal, in cross section thereby providing a plurality of outwardly facing plane surfaces. A plurality of outlet ports extend from the central bore of the cylinder to respective ones of these faces. These ports are axially displaced from one another along the cylinder with the first and last ports in the series, 37 and 39 respectively, extending to the top external surface of the cylinder. A typical intermediate port 41 is shown extending from the central bore toward the bottom external face of the cylinder. An outlet fitting 45 is connected to the outlet port 41 for coupling it to a lubrication point on a machine which is to be lubricated. Cylinder 13 also includes an inlet port 49 extending from the central bore to the top exterior surface plane at a point axially displaced to the left from the outlet ports.

The plunger 15 has an annular groove 51, an axial passage 53, and radial ports at 55 which establish fluid communication between passage 53 and groove 51. The valve fitting 21 includes an axial passage 57 aligned with the passage 53 and radial ports at 59 at the left-hand end of the axial passage 57 which permits fluid to pass from the outside of the fitting into the axial passage 57. A spring-loaded ball check valve 61 permits fluid flow in one direction only from the passage 57 into the plunger passage 53.

The operation of this injector is completely described in the aforesaid Rotter U.S. Patent 2,694,977. However, the following short description of its operation is included herein to facilitate an understanding of the present invention. When the plunger 15 is drawn fully to the right as shown in FIG. 1, lubricant supplied to the inlet 49 can enter the central bore of cylinder 13 around the fitting 21 and the plunger extension 25, substantially filling that space. When the plunger 15 is then moved toward the left, lubricant must be forced out of the central bore since the diameter of the extension 25 which is leaving this space is less than the diameter of the plunger 15 entering it. Accordingly, there will be a displacement of lubricant which is proportional to the difference in cross sectional area between plunger 15 and extension 25 as well as to the length of travel of these members. Lubricant can initially escape back out of inlet port 49 until the full-diameter portion of plunger 15 passes over and closes that port. The dimensions of the injector are such that, just as the inlet 49 is completely sealed, the annular groove 51 on plunger 15 comes into communication with the first injector outlet port 37. During that displacement of the plunger 15 which occurs while groove 51 is in communication with port 37, the displaced fluid from the space around the extension 25, since it can no longer escape through the port 49, will be forced through the passage 57, past check valve 61 and through passages 53 and 55 and the outlet port 37.

The dimensions of the injector are further such that, as the annular groove 51 moves out of communication with the port 37, it moves into communication with the second of the axially displaced outlet ports, the pumping action being there repeated. As explained previously, the successive intermediate outlet ports extend radially from the central bore of the cylinder 13 to the various exterior faces of the polygonal cylinder and hence, except for the port 41, are not visible in FIG. 1. The intermediate injector outlet ports are connected to the various points to which lubricant is to be supplied. If the plunger 15 executes a full stroke, a metered volume of lubricant will be forced out of each of the outlet ports in succession. The outlet port 39 is the last to receive lubricant in each cycle and thus, if there is any failure in the operation of the lubricating system, port 39 will typically be the first to be deprived of its supply of lubricant. This aspect of the operation of the injector is noteworthy in that it is utilized by the failure indicator described hereinafter.

The lubricant injector 11 is powered by an air motor 63, the injector plunger 15 being coupled to piston 65 of the motor. The injector and its air motor are protected by a sheet metal enclosure 66. Air motor 63 is connected to a main air supply at a motor air inlet port 67 and has a control port 69. A control piston 71 is movable to the right as seen in the drawing against a compression spring 72. Piston 71 has an annular recess 73 which permits supply air from the port 67 to communicate with spaces indicated at 75 and 77, also to communicate via an air bleed passage 78 in the piston with the space to the left of the piston (with which control port 69 communicates). The piston 71 also carries, within the annular groove 73, a D-valve 79 which operates to connect the supply air to one side of piston 65 while venting the other side to an exhaust port 70.

When control port 69 is vented to atmosphere via a control valve (not shown in FIG. 1), the spring 72 moves the piston 71 to its extreme left-hand position as shown in FIG. 1, and the D-valve 79 vents the space to the left of motor piston 65 to the exhaust port 70. Simultaneously, the main supply air pressure is applied from the space 77 to the right side of piston 65. This drives piston 65 and plunger 15 to the left so as to pump lubricant through the various outlet ports as previously described. The pressure applied to the right side of piston 65 is also tapped off through a fitting 81 for purposes to be described hereinafter relating to the failure indicator.

When the valve (not shown in FIG. 1) which controls port 69 is closed, air under pressure is supplied through the bleed passage 78 to the left of the piston 71, and the latter is driven to the right against the return bias of spring 72 so that the connections established by the D-valve 79 will be reversed. Thus, the pressure on the right side of the piston 65 will be vented through the exhaust port 70 while main air supply pressure is applied from the space 75 to the space to the left of the piston 65. Accordingly, the piston 65 will draw the plunger 15 to the right thereby recharging the central bore of the pump cylinder 13 with lubricant. The control valve for port 69 may be a poppet valve of the same type as shown in the coassigned U.S. Patent application of Carl H. Mueller et al., Ser. No. 273,221, filed Apr. 15, 1963, now U.S. Patent No. 3,232,379, and entitled Lubricating Apparatus, actuated by a cam on a shaft driven in timed relation to the machine serviced by the injector.

A failure indicator of this invention, generally designated 83, is shown to comprise a body 85 having an enlarged base 87 secured to the top of lubricant injector cylinder 13 by screws 89. Body 85 has a horizontal cylindric recess 91 extending inward from its right-hand side as shown in FIGS. 2 and 3, terminating short of its left-hand side. A washer 93 is seated at the inner end of this recess. A cylinder 95 extends into the recess. This cylinder has a flange 97 abutting the right-hand side of body 85 and secured thereto by screws 99. It terminates short of the washer 93. The space between the inner end of cylinder 95 and the washer and the inner end of the bore of cylinder 95 constitutes a chamber designated 101. Body 85 has two spaced vertical lubricant delivery passages 103 and 105 which extend upward from the first and last injector outlet ports 37 and 39. Passage 103 extends from the first injector outlet port 37 into communication with an annular peripheral groove 107 of cylinder 95. Passage 105 communicates with chamber 101. Radial ports 109 interconnect groove 107 and the bore of cylinder 95.

Body 85 has a vertical passage 110 located between its left-hand side and the inner end of recess 91, this passage 110 communicating with the injector inlet port 49, and a horizontal vent passage 111 extending from the upper end of passage 110 to the right-hand side of the body. The right-hand end of passage 111 is closed by the flange 97. Body 85 is also provided with a horizontal lubricant inlet 113 in communication with passage 110 for delivery of lubricant from a reservoir R (see FIG. 4) to the inlet 49 of injector 11, and also for return of lubricant from chamber 101 and passage 111 to the reservoir. A manually operable push-button type vent valve 115 is provided at the top of body 85. This is normally held closed by a spring 117, and is adapted to be opened when the system is initially primed with lubricant or at other times for purging air from the system.

A tubular retainer 119 is threaded in a tapped hole 121 extending from the left-hand side of body 85 to the passage 110 coaxial with recess 91 in the body. Fitted in the inner end of retainer 119 is a valve sleeve 123 which extends out of the inner end of the retainer, and which spans the passage 110, having its right-hand end sealed in a reduced-diameter continuation 91a of recess 91. Sleeve 123 is open at its inner end to the chamber 101 via the center hole in washer 93. It has radial ports 125 for communication from its bore to passage 110. A valve plunger 127 has a sliding sealing fit in the valve sleeve 123. This plunger is biased in the direction toward the chamber 101 by a spring 129 reacting from a plug 131 adjustably threaded in the outer end portion of retainer 119. Inward movement of the plunger is limited by engagement of its inner end with washer 93 (which constitutes a stop). Outward movement of the plunger is adjustably limited by engagement of a tail 133 on the plunger with plug 131. The stroke of the plunger may be adjusted by screwing up or backing off the plug.

The plunger 127 is movable outward (toward the left as viewed in FIGS. 2 and 3) against the return bias of spring 129 in response to increase of pressure in chamber 101 to a value sufficient to overcome the spring bias. It is provided with a helical groove 135 on its inner end portion providing a capillary passage for lubricant. The length of this groove 135 is slightly less than the distance from ports 125 to the plunger stop 93, which is located at the inner end of the sleeve 123. Thus, when plunger 127 is in its extreme inner position of FIGS. 2 and 3 (wherein its inner end engages the plunger stop 93), flow through the groove 135 is blocked, but when plunger 127 moves to the left, the groove comes into communication with ports 125 for venting chamber 101 to the passage 110 and hence via lubricant inlet 113 back to the lubricant reservoir.

A plunger 139 has a sliding sealing fit in cylinder 95. A fitting 141 is threaded in the outer end of the bore of cylinder 95, and is closed by a cap 143. Plunger 139 has a reduced-diameter extension 145 extending through the fitting 141, providing an annular shoulder 147 at the right end of the plunger proper engageable with the inner end of the fitting 141 to limit the outward movement of the plunger. The fitting has a tapered nose 149 providing an annular space within the bore of cylinder 95 around the nose, and flange 97 has an air inlet port 151 in communication with this space for delivering pulses of air to cylinder 95 for pressurizing plunger 139 to force it inward (toward the left as viewed in the drawings).

Cylinder 95 has an annular peripheral groove 153 spaced axially inward from groove 107. O-ring seals such as indicated at 155 are provided between the cylinder and the cylindric wall of recess 91 inward of groove 153, between the grooves 153 and 107, and outward of groove 107. Body 85 has a pressure outlet port 157 and a passage 159 interconnecting this outlet port and groove 107 (see FIG. 3). Cylinder 95 has a port 161 interconnecting its bore and groove 153, and body 85 has a port 163 interconnecting groove 153 and passage 111. Plunger 139 has a relatively wide annular peripheral groove 165 constituting this plunger as a valve for controlling ports 109 and 161. When the plunger 139 moves far enough to the left for groove 165 to come into communication with port 161, it vents the pressure outlet port 157 to passage 111 via passage 159, groove 107, ports 109, groove 165, port 61, groove 153 and port 163 (see FIG. 2).

Pressure outlet port 157 has a fitting 167 threaded therein connected back to the lubricant supply reservoir R by a lubricant line 169 (see FIG. 4). In this line 169 is a check valve 171 adapted to hold pressure below a predetermined value in the port 157 and in line 169 between the port 157 and the check valve. A pressure switch 173 is tapped into line 169 between the port 157 and the check valve to be responsive to pressure in the port 157. Switch 173 is shown connected as at 175 to control both an alarm 177 at a central station and any suitable means such as indicated at 179 for shutting off the machine (such as an engine or pump) lubricated by the injector in the event of failure of the injector to deliver lubricant which, as will appear, results in loss of pressure in port 157 and line 169. It will be understood that switch 173 may control an alarm only, or possibly a shut-off only.

In the use and operation of the failure indicator 83 in conjunction with injector 11, the first injector outlet port 37 and the last injector outlet port 39 are utilized solely for indicator purposes, the lubricating function of the injector being served by connecting the injector outlet ports intermediate the first and last injector outlet ports to various points of lubrication of the machine to be lubricated. Pulses of air are periodically delivered to cylinder 95 via port 151 by any suitable means, one of which will be subsequently described.

Assuming the injector 11 is operating properly to deliver lubricant through all of its outlet ports, including the last outlet port 39, plunger 139 will occupy its retracted position of FIG. 3, or a position somewhat to the left of its retracted position (in any event, a position in which port 161 is blocked off from ports 109) during intervals between each pneumatic pulsing of the plunger and the next ensuing operation of the injector. Chamber 101 will be full of lubricant. Valve plunger 127 will be in its home position of FIG. 3. Pressure outlet port 157 and line 169 down to check valve 171 carry lubricant under pressure to hold pressure switch 173 off. On the next cycle of the injector 11, a metered volume of lubricant will be delivered through the first injector outlet port 37, followed by delivery of metered volumes of lubricant through the successive injector outlet ports to the points of lubrication serviced thereby, and finally a metered volume of lubricant will be delivered through the last injector outlet port 39. The volume delivered through the first port 37 passes through passage 103, groove 107, passage 159, and pressure outlet port 157 to lubricant line 169. If line 169 is fully primed with lubricant down to the check valve 171 under sufficient pressure to hold pressure switch 173 off, as is normal, the lubricant so delivered from the first injector outlet port will simply effect opening of the check valve 171 to bleed off the excess lubricant back to the lubricant reservoir. If, however, line 169 should require lubricant (i.e., if the pressure in line 169 should be down), the delivery of lubricant to line 169 from the first injector outlet port will build up the pressure in line 169 to maintain pressure switch 173 off.

The volume of lubricant delivered through the last injector outlet port 39 flows through passage 105 to chamber 101. If plunger 139 is in a position spaced inward from its fully retracted position of FIG. 3, it is immediately driven outward to its retracted position. The incoming lubricant forces valve plunger 127 outward to the outer end of its stroke determined by engagement of its tail 133 with the plug 131. As soon as the capillary groove 135 of plunger 127 encounters ports 125, lubricant may bleed off from chamber 101 through the groove 135 and the ports, but exit of lubricant from chamber 101 via capillary groove 135 of plunger 127 is sufficiently slow as to assure full outward movement of the plunger 127. Upon drop of pressure in chamber 101 to a value insufficient to overcome the return bias of spring 129, the latter drives plunger 127 relatively slowly back inward to its inner limit (its FIG. 3 position) so that the plunger displaces the lubricant which entered sleeve 123 via the center hole in the plunger stop 93 out via the capillary groove 135 and ports 125 to the passage 110 (which is in communication back to the lubricant reservoir R via lubricant inlet 113). The displacement of the plunger 127, as determined by the adjustment of plug 131, and hence the volume of lubricant vented off through the capillary groove on return of plunger 127 by spring 129 is less than the volume of lubricant metered out through the last injector outlet port 39.

Following the above, the pulse of air (of limited duration) is applied to plunger 139 via air inlet 151. This drives plunger 139 inward (to the left) from its FIG. 3 fully retracted position. Plunger 139 thereupon acts through the lubricant in chamber 101 to drive plunger 127 outward to effect further bleeding off or venting of lubricant from chamber 101 via the capillary groove 135 of plunger 127 and ports 125, the amount so bled off being determined by the duration and force of the pulse, and the viscosity of the lubricant. The thinner the lubricant, the more is bled off and the thicker the lubricant, the less is bled off. The duration and force of the pulse are made such that, in no event, will a single pulse of plunger 139 be sufficient to move it from its retracted position to its position for venting the pressure outlet port 157 via passage 159, groove 107, ports 109, plunger 139, groove 165, port 161, etc. On termination of the pneumatic pulse, plunger 127 is returned by spring 129 to its normal FIG. 3 position, and acts through the lubricant in chamber 101 to push back the plunger 139. In this manner, the unit 83 bleeds off lubricant delivered thereto from the last injector outlet port 39, and conditions itself for the next cycle of operation of injector 11.

Failure of proper operation of injector 11 for any of various reasons is inherently reflected in failure of delivery of lubricant through the last injector port 39. Whenever this occurs, on each ensuing delivery of a pulse of air to cylinder 95, plunger 139 is driven inward and acts through the lubricant in chamber 101 to drive valve plunger 127 outward to bleed off from chamber 101 via capillary groove 135 on each pulse a quantity of lubricant (the amount depending, as before, on the duration and force of the pulse and the viscosity of the oil), without replenishment of lubricant in chamber 101 from port 39. The result of this is that plunger 139 is driven inward in steps to its pressure-venting position wherein groove 165 in plunger 139 is in communication with port 161. Thereupon, port 157 is vented via groove 107, ports 109, groove 165, port 161 and groove 163 to vent passages 111, 110, and pressure line 169 is vented to actuate the pressure switch 173 to sound the alarm 177 and/or take other control measures. The number of pulses required before plunger 139 reaches its pressure-venting position is dependent upon the viscosity of the lubricant, being fewer when the viscosity is lower (e.g., when the lubricant is relatively hot), and greater when the viscosity is higher (e.g., when the lubricant is relatively cold). This is because, with a given pulse duration and pulse force, more of a thin lubricant will bleed off through capillary passage 135 on each pulse than a thick lubricant. Thus, in a typical case, it may take thirty-four air pulses (at the rate of four per minute) to sound the alarm if the oil is at 80° F. (eight and one-half minutes), but only four pulses (one minute) if the oil is at 120° F. In any event, accommodation is made for variation in lubricant viscosity to insure some delay (so as not to sound the alarm on a temporary failure) even if the lubricant should become thin without unduly prolonging the sounding of the alarm if the lubricant should become thick.

In a typical installation, a plurality of injectors 11 are provided for lubricating all the points of lubrication of a machine, and their operation is timed from the machine via control of poppet valves connected to control ports 69 of the injectors motors 63. This may be utilized to control the pulsing of air to cylinders 95 of the failure indicators for the injectors. FIG. 4 illustrates an arrangement for carrying this out by pairing two injectors 11A and 11B, each having a failure indicator 83. At 181 is indicated a timing valve unit which may be of any suitable construction, having a shaft 183 which is driven in timed relation to the machine serviced by the injectors. The unit 181 includes a pair of normally closed poppet valves 185 controlled by cams 186 driven by the shaft 183 for timing venting of air from the injector motor control ports 69 via air vent lines 187. Main air supply lines for the motors of the two injectors are indicated at 189. Port 81 of the motor for injector 11A is interconnected by a line 191 with port 151 of the failure indicator 83 for injector 11B, and port 81 of the motor for injector 11B is interconnected by a line 193 with port 151 of the failure indicator 83 for injector 11A. The timing valve unit 181 is operable to cause injectors 11A and 11B to be operated alternately. When the poppet valve 185 for the motor for injector 11A is opened to vent air from the left of the control pistion 71 of this motor, thereby to drive the D-valve of this motor to the left as viewed in FIG. 1, air is not only pulsed to the right-hand side of piston 65 of this motor but also pulsed through port 81 of this motor and line 191 to port 151 of the failure indicator 83 associated with injector 11B, and vented when the D-valve is returned to the right. Similarly, when the poppet valve 185 for the motor for injector 11B is opened to vent air from the left of the control piston 71 of this motor, air is not only pulsed to the right-hand side of the piston 65 of this motor but also through port 81 of this motor and line 193 to port 151 of the failure indicator 83 associated with injector 11A, and then vented.

From the above it will appear that, as specifically shown herein, unit 83 and pressure-responsive switch 173 connected to the pressure line 169 constitute means connected to the last outlet port 39 of the injector 11 for signalling a failure in the operation of the injector in response to failure of delivery of lubricant through the last outlet port for a plurality of strokes of the injector plunger 15. It will be understood, however, that unit 83 and the associated switch 173 may be used to detect a failure in the operation of any intermittently-operated pump which normally delivers a metered volume of fluid on each cycle of operation. Unit 83 essentially comprises means defining chamber 101 for holding fluid, and having inlet 105 for delivery of fluid to this chamber from the pump (more particularly, for delivery of lubricant from the last outlet port 39 of the injector). The valve sleeve or cylinder 123 and the capillary-grooved valve plunger 127 constitute valve means for venting the chamber 101 in response to delivery of fluid to the chamber. This is of the positive displacement type, the displacement of the valve plunger 127 being less than the metered volume of fluid normally delivered to chamber 101. Fluid in chamber 101 is pressurized following each operation of the pump or injector by the action of pressure plunger 139 (which is pneumatically pressurized at appropriate intervals). This pressure plunger 139 must move through a predetermined distance away from its retracted position to effect signalling, but each pulse thereof moves it through a lesser distance, hence it requires a plurality of pulses of plunger 139 after a failure before a signal is given. The number of pulses depends on the viscosity of the fluid, but the arrangement is such that even when the fluid is thin, a plurality of pulses are required after a failure before the signal is given (to avoid signalling if the failure of the pump or injector is only temporary), without requiring an excessive number of pulses for signalling a failure if the fluid should be thick.

With conventional check valves at 171, under certain circumstances such as loss of air from the air system for actuating the motors 63 for driving the injectors 11A and 11B, or failure of the timer unit 181, no failure signal may be given. To insure signalling of failure under such circumstances, a special check valve 171a such as shown in FIG. 5 may be used at locations 171 shown in FIG. 4. This check valve 171a has a bleed incorporated therein so that, when in its normally closed condition, it allows slow bleeding of lubricant from line 169 to the reservoir R, with the result that, on loss of air from the air system or failure of timer unit 181, with resultant failure of operation of motors 63, lubricant will in due course bleed off from lines 169, resulting in drop of pressure in these lines to actuate pressure switches 173 to sound the alarms 177. As long as motors 63 are operating properly, however, lubricant is periodically delivered to lines 169 from the first outlet ports 37 of the injectors to make up for lubricant which bleeds off through the check valves 171a, thereby maintaining pressure in lines 169 to keep switches 173 from sounding the alarms.

The check valve 171a comprises a body 201 having an axial bore 203 extending inward from its left end. A nipple 205 is seated at the inner end of this bore. Body 201 has an axial inlet 207 in communication with the the nipple, and a lateral outlet 209. A tubular retainer 211 is threaded in a counterbore 213 at the outer end of bore 203, and extends out to the left from the body. The outer end of retainer 211 is closed at 215. Fitted in the inner end of the retainer is a valve sleeve or cylinder 217 which extends out of the inner end of the retainer across the lateral outlet port 209, having its inner end sealed in the inner end portion of bore 203. Nipple 205 extends into the inner end of the sleeve. A valve plunger 219 has a sliding fit in the sleeve, and is biased by a spring 221 to a normally closed position determined by engagement of its inner end with the nipple (which acts as a stop). The end of the nipple is formed in any suitable way so that the end of the plunger does not fully close the end of the nipple. The plunger is provided with a helical groove 223 on its inner end portion providing a capillary passage for lubricant. Sleeve 217 has radial vent ports 225 in communication with outlet port 209. Groove 223 extends back far enough from the inner end of the plunger for restricted communication with ports 225 when the plunger is in its normally closed position, resulting in slow bleeding of lubricant from inlet 207 through the capillary passage provided by groove 223 and the ports 225 to the outlet 209. The plunger is movable outward from its closed position against the bias of spring 221 on increase of pressure in inlet 207, resulting in shortening of the length of the capillary passage and spring-pressurizing of lubricant entering sleeve 217 for more rapid flow of lubricant through the capillary passage and ports 223 to the outlet 209.

As to either injector 11A or 11B, some lubricant will bleed out of the respective line 169 to the reservoir R through the respective check valve 171a during each interval between successive operations of the injector, but the amount of bleed during such interval is low enough that the associated pressure switch 173 will not be actuated. Then, on the next operation of the injector, the amount of lubricant lost via the bleed is made up by delivery of lubricant from the first injector outlet port 37, assuming the injector is operating. If there should be a failure in the operation of the injector (on account of failure of operation of the injector motor because of loss of air or timer unit failure, for example), line 169 is not replenished with lubricant from the first injector outlet port, and ultimately sufficient lubricant will bleed off from line 169 via the check valve 171a to effect sounding of the alarm.

It will be understood that instead of using two check valves 171 or 171a, only one check valve may be used in a common connection of the lines 169 back to the reservoir R.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Lubricating apparatus comprising a lubricant injector, said injector comprising a cylinder having a lubricant inlet supplied with lubricant from a reservoir and a series of outlet ports spaced at intervals along its length and a plunger working in the cylinder adapted on a pressure stroke thereof to force a metered volume of lubricant out through each outlet port in succession, and means connected to the last outlet port of the series for signalling a failure in the operation of the injector in response to failure of delivery of lubricant through said last outlet port, said means being conditioned for signalling only after failure of delivery for a plurality of strokes of the plunger.

2. Lubricating apparatus as set forth in claim 1 wherein said signalling means includes means for venting the output of the last outlet port back to the reservoir.

3. Lubricating apparatus as set forth in claim 2 wherein said signalling means includes a pressure line and a pressure-responsive signal switch connected with said line.

4. Lubricating apparatus as set forth in claim 3 wherein said signalling means is connected to the first outlet port of the series for charging said pressure line with lubricant under pressure from said first outlet port.

5. Lubricating apparatus as set forth in claim 4 wherein said line has a check valve for holding pressure therein and is connected to return excess lubricant to the reservoir.

6. Lubricating apparatus as set forth in claim 5 having a bleed for bleeding lubricant from said line to effect operation of said signalling means on prolonged failure of said line to become charged with lubricant from said first outlet port.

7. Lubricating apparatus as set forth in claim 6 wherein said bleed is incorporated in said check valve.

8. Apparatus for detecting a failure in the operation of an intermittently-operated pump which normally delivers a metered volume of fluid on each cycle of operation thereof comprising means defining a chamber for holding fluid having an inlet for delivery of fluid thereto from the pump, means for venting fluid from said chamber, said venting means being operable in response to delivery of fluid to said chamber, means for pressurizing fluid in said chamber following each operation of the pump, said venting means being further operable in response to operation of said pressurizing means to vent fluid from said chamber, and means responsive to operation of said pressurizing means following failure of the pump to deliver said metered volume for signalling said failure.

9. Apparatus as set forth in claim 8 wherein said pressurizing means is operable for a limited interval following each operation of the pump and said signalling means is operable in response to repeated operation of said pressurizing means following failure of the pump.

10. Apparatus as set forth in claim 9 wherein said signalling means comprises a pressure line and a pressure-responsive signal switch connected with said line.

11. Apparatus as set forth in claim 10 wherein said line normally holds fluid under pressure to hold said switch off, and said apparatus includes means for venting said line in response to repeated operation of said pressurizing means following failure of the pump.

12. Apparatus for detecting a failure in the operation of an intermittently-operated pump which normally delivers a metered volume of fluid on each cycle of operation thereof comprising means defining a chamber for holding fluid having an inlet for delivery of fluid thereto from the pump, a valve for venting fluid from said chamber, said valve comprising a valve cylinder having a vent and a valve plunger slidable in said valve cylinder, said valve plunger being movable between a closed position blocking said vent and a fully open position, the displacement of the valve plunger being less than said metered volume, means biasing said valve plunger toward its closed position, said valve plunger, upon movement away from its closed position, establishing communication between the chamber and said vent, said valve plunger being movable to its fully open position in response to delivery of said metered volume by the pump and then back to its closed position to displace a quantity of fluid less than said metered volume through said vent, a pressure plunger for pressurizing fluid in said chamber, means for actuating said pressure plunger following each operation of the pump, said valve plunger being movable away from its closed position on actuation of said pressure plunger further to vent fluid from said chamber, and means responsive to operation of said pressure plunger following failure of the pump to deliver said metered volume for signalling said failure.

13. Apparatus as set forth in claim 12 having means for adjusting the stroke and hence the displacement of said valve plunger.

14. Apparatus as set forth in claim 13 wherein said adjusting means also adjusts the bias of said biasing means.

15. Apparatus as set forth in claim 12 wherein said valve plunger is formed to provide a restricted passage for flow of fluid from the chamber to said vent.

16. Apparatus as set forth in claim 15 wherein said passage is constituted by a helical groove in the periphery of the valve plunger.

17. Apparatus as set forth in claim 12 wherein said pressure plunger has a retracted position and said signalling means is operable in response to movement of the pressure plunger through a predetermined distance away from its retracted position, said means for actuating the pressure plunger being operable to effect limited movement of said pressure plunger through a distance less than said predetermined distance on each operation thereof, whereby said signalling means is operable in response only to a plurality of operations of the pressure plunger after a failure.

18. Lubricating apparatus comprising a lubricant injector, said injector comprising a cylinder having a lubricant inlet supplied with lubricant from a reservoir and a series of outlet ports spaced at intervals along its length and a plunger working in the cylinder adapted on a pressure stroke thereof to force a metered volume of lubricant out through each outlet port in succession, and means for signalling failure in the operation of the injector properly to deliver lubricant through the last outlet port of the series comprising a body having a chamber and a passage for delivery of lubricant from said last outlet port to the chamber, a valve for venting lubricant from said chamber, said valve comprising a valve cylinder having a vent and a valve plunger slidable in said valve cylinder, said valve plunger being movable between a closed position blocking said vent and a fully open position, the displacement of the valve plunger being less than said metered volume, spring means biasing said valve plunger toward its closed position, said valve plunger, upon movement away from its closed position, establishing restricted communication between the chamber and said vent, said valve plunger being movable to its fully open position in response to delivery of said metered volume through said last outlet port and then back to its closed position to displace a quantity of lubricant less than said metered volume through said vent, a pressure plunger movable in one direction away from a retracted position for pressurizing lubricant in said chamber, said valve plunger being movable away from and back to its closed position on actuation of the pressure plunger further to vent lubricant from said chamber, signalling means operable in response to movement of said pressure plunger through a predetermined distance away from its retracted position, and means for pressurizing the pressure plunger following each pressure stroke of the injector to move it through a distance less than said predetermined distance, whereby said signalling means is operable in response only to a plurality of operations of the pressure plunger after failure in the operation of the injector properly to deliver lubricant through said last outlet port.

19. Lubricating apparatus as set forth in claim 18 having means for adjusting the stroke of said valve plunger and the bias of said spring means on the valve plunger.

20. Lubricating apparatus as set forth in claim 18 wherein the plunger has a peripheral helical groove for establishing said restricted communication between said chamber and said vent.

21. Lubricating apparatus as set forth in claim 18 wherein said body has a passage for delivery of lubricant from the reservoir to the injector inlet and said vent opens to said passage.

22. Lubricating apparatus as set forth in claim 21 wherein said body has a pressure port, said signalling means comprising a pressure-responsive signal switch connected to said pressure port, said pressure plunger holding pressure in said pressure port and switch, and venting said pressure port and switch upon movement thereof through said predetermined distance away from its retracted position.

23. Lubricating apparatus as set forth in claim 22 wherein said signalling means comprises a pressure line interconnecting said pressure port and said reservoir, said switch being connected with said line, said line having a check valve therein for holding pressure in said switch, and said body and pressure plunger being passaged for delivering lubricant from the first outlet port of the series through said pressure port to said line.

24. Lubricating apparatus as set forth in claim 23 having a bleed for bleeding lubricant from said line to effect operation of said signalling means on prolonged failure of said line to become charged with lubricant from said first outlet port.

25. Lubricating apparatus as set forth in claim 24 wherein said bleed is incorporated in said check valve.

26. Lubricating apparatus as set forth in claim 18 wherein the pressure plunger is slidable in a cylinder in said body, and the means for pressurizing the pressure plunger comprises means for delivering pneumatic pulses of limited duration to said pressure plunger cylinder at intervals.

References Cited
UNITED STATES PATENTS

| | | | |
|---|---|---|---|
| 2,581,478 | 1/1962 | Gaddoni | 137—54 X |
| 3,026,387 | 3/1962 | Ashbaugh | 184—6 X |
| 3,127,586 | 3/1964 | Heyn et al. | 184—6 X |
| 3,196,262 | 7/1965 | Rogerson | 184—6 |

FOREIGN PATENTS

| | | |
|---|---|---|
| 952,907 | 5/1949 | France. |

LAVERNE D. GEIGER, *Primary Examiner.*

H. S. BELL, *Assistant Examiner.*